United States Patent [19]
Gooch

[11] 3,713,732
[45] Jan. 30, 1973

[54] TWO PIECE GOGGLE CONSTRUCTION
[75] Inventor: Lester Gooch, Coudersport, Pa.
[73] Assignee: Midland Optical, Incorporaed, Coudersport, Pa.
[22] Filed: June 8, 1971
[21] Appl. No.: 150,951

[52] U.S. Cl. .................351/153, 351/116, 351/121
[51] Int. Cl. ...........................G02c 5/14, G02c 5/22
[58] Field of Search......351/153, 104, 105, 116, 121, 351/140, 52; 2/14; 16/128 A, 128 B

[56] References Cited

UNITED STATES PATENTS 2,380,638   7/1945   D'Urbano..............................351/105

FOREIGN PATENTS OR APPLICATIONS 682,352   11/1952   Great Britain..........................351/52

Primary Examiner—David Schonberg
Assistant Examiner—Robert L. Sherman
Attorney—Zachary T. Wobensmith, 2nd

[57] ABSTRACT

A goggle is disclosed which comprises two molded synthetic plastic interlocking components one of which comprises a front frame with an upper bridge bar and transparent plates or lenses therebelow and with hinge guide elements at the ends, and the other of which comprises temples hinged to a coacting brow bar and with complemental hinge guide components interfitting with the hinge guide elements of the frame component to provide for hinge action, limited lateral movement of the temples and restricted vertical movement at the hinge guide elements throughout the travel range of the temples.

7 Claims, 7 Drawing Figures

PATENTED JAN 30 1973

INVENTOR
LESTER GOOCH

BY
B. T. Wobensmith

ATTORNEY

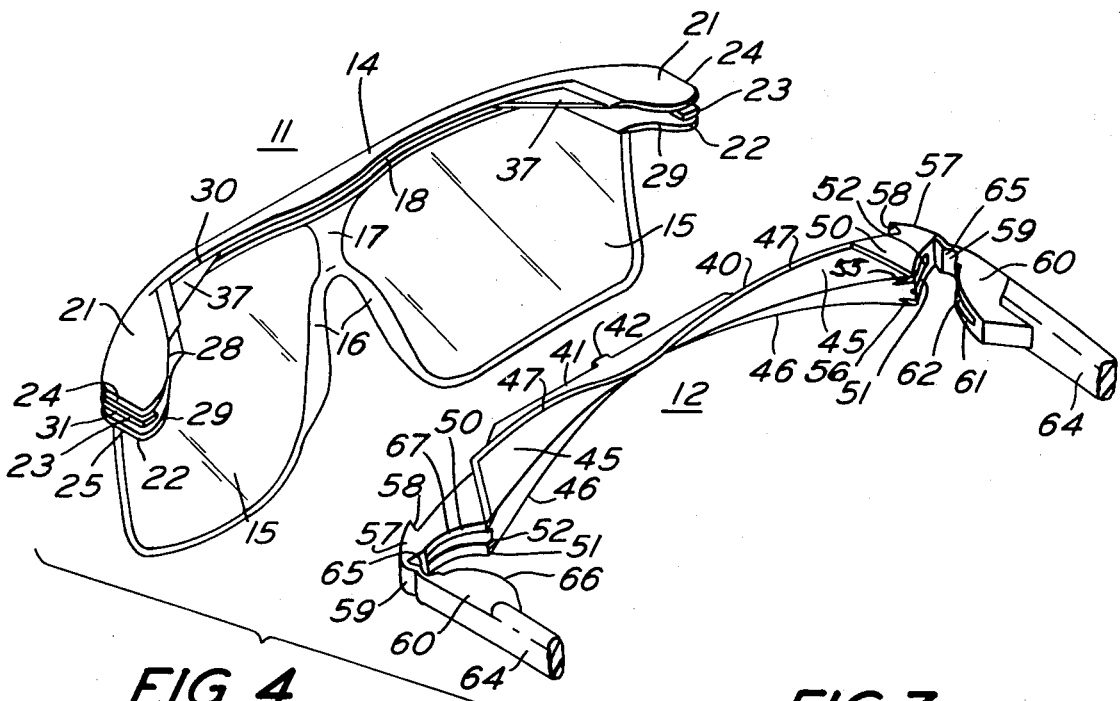

TWO PIECE GOGGLE CONSTRUCTION

BACKGROUND OF THE INVENTION

1. Field of the Invention

This invention relates to goggles and more particularly to goggles made of a plurality of easily assembled molded synthetic plastic components.

2. Description of the Prior Art

It has heretofore been proposed to make goggles similar to eyeglasses from a multiplicity of parts with a separate plastic frame carrying protective lenses and with separate temples hinged to the frame.

It has also been proposed to make sunglasses of molded synthetic plastic, and of one piece, such as shown by Bolle et al., in U.S. Pat. No. 3,526,449. Such sunglasses by reason of their construction have severe inherent limitations on the size and shape of the transparent lens portions and are not suited for collapse for carrying in the pocket.

It has also been proposed by McBrayer, in U.S. Pat. No. 3,378,851, to provide adjustable eyeglasses in which a fabric frame carries unbreakable plastic lenses with individual elastic bands on each side taking the place of temples. This construction lacks the rigidity desired by many users.

It has also been proposed to use a flexible band as a hinge, as in Grossbeck et al., U.S. Pat. No. 2,526,129, with reliance on the length of the hinge and the attachment of the band to adjoining parts to provide stability. It has also been proposed to employ, in a hinge, mating projections as in Heidler, U.S. Pat. No. 3,048,806, to provide stability. These constructions are however totally unsuited for use in goggles, eyeglasses and the like where the available space is restricted and where a unitary construction of bridge and of temples is desired.

There have also been numerous hinge constructions proposed for goggles and eyeglasses but these have usually employed separate hinge plates attached respectively to the lens frame and temple with insertable hinge pins for pivoting of the hinge plates.

None of the structures heretofore available provided a goggle assembled from two components, a frame component and a temple component, each molded from synthetic plastic and capable of easy assembly for use and without the necessity for inserted hinge pins.

SUMMARY OF THE INVENTION

In accordance with the invention a goggle is provided composed of two easily assembled interlocking components of molded synthetic plastic, one of which comprises a front frame with an upper bridge bar and transparent plates or lenses therebelow and with hinge guide elements at the ends and the other of which comprises temples hinged to a coacting brow bar and with complemental hinge guide components interfitting with the hinge guide elements of the frame component, the construction at the hinge guide elements providing horizontal hinge action for movement of the temples to extreme positions for use and for storage, with limited lateral movement of the temples and with restricted vertical movement at the hinge guide elements throughout the travel range of the temples.

It is the principal object of the present invention to provide a goggle which is simple in construction yet sturdy, of which the components are molded of synthetic plastic for quick assembly for use.

It is a further object of the invention to provide a goggle having an improved hinge construction which eliminates the necessity for attaching hinge plates and for the use of hinge pins and permits of movement of the temples to a position for use as well as to collapsed positions for storage.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 4 is a fragmentary sectional view, enlarged, taken approximately on the line 4—4 of FIG. 1;

FIG. 5 is an exploded perspective view showing the components prior to assembly;

FIG. 6 is a fragmentary sectional view taken approximately on the line 6—6 of FIG. 2; and FIG. 7 is a fragmentary top plan view of the hinge construction.

Figure 1:
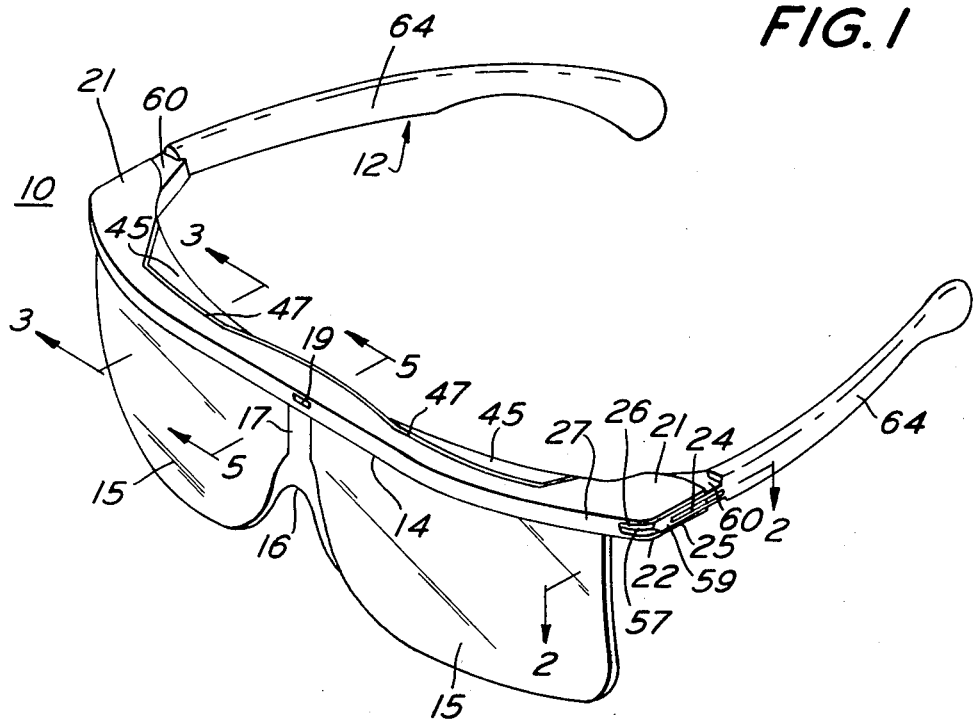
FIG. 1 is a view in perspective of goggles in accordance with the invention.

It should, of course, be understood that the description and drawings herein are illustrative merely and that various modifications and changes can be made in the structure disclosed without departing from the spirit of the invention.

Like numerals referred to like parts throughout the several views.

DESCRIPTION OF THE PREFERRED EMBODIMENT

Referring now more particularly to the drawings, the goggle is shown at 10 and includes two components, a front component shown generally at 11 and a temple component shown generally at 12.

The front component 11 which is preferably of relatively rigid synthetic plastic comprises a frame with an upper bridge bar 14 having transparent plates or lenses 15 extending downwardly therefrom with a nose engaging position 16 and reinforcing rib 17 therebetween.

The bar 14, along the central part of the rear edge thereof, is provided with a groove 18 and at the center has a slot 19 extending forwardly with a front locking shoulder 20.

At the ends of the bar 14 and extending in partial overlapping relation to the plates or lenses 15, and extending from inner end faces 26, upper and lower guide plates 21 and 22 are provided, in vertically spaced relation, and with an intermediate guide plate 23 therebetween and in spaced relation thereto. The guide plates 21 and 22 have curved outer aligned edges 24 and 25 extending around the ends and rearwardly and formed as continuations of the outer forward edge 27 of the bar 14 and inner edges 28 and 29 which extend to the inner edge 30 of the bar 14.

The intermediate guide plate 23 has an outer edge, a portion 31 of which is aligned with the edges 24 and 25 and a portion 32 of which is inset to provide an intermediate projection 33 which serves as a partial fulcrumn.

The intermediate guide plate 23 has an inner edge which has a shoulder portion 35 to serve as a limit stop for outward temple movement and a portion 36 relieved to permit temple movement to storage position, and a connecting and bracing portion 37 which extends to and terminates at the groove 18.

The temple component 12 which is preferably made of a more flexible and pliable synthetic plastic material, and preferably rubber like, includes a central brow bar 40 with a forwardly extending central flange 41 for engagement in the groove 18 and an integral central locking pin 42 for insertion in the slot 19. The pin 42 has a locking finger 43 for engagement with the locking shoulder 20 (see FIG. 4).

The brow bar 40 is of increasing thickness from its center toward its ends with upper and lower faces 45 and 46 terminating at their front margins with longitudinal rims 47 and 48 which engage the inner edge 30 of the upper bridge bar 14.

The brow bar 40, inwardly of its ends, has plate portions 50 and 51 separated by a slot 52. The plate portions 50 and 51 have upper and lower inset faces 53 and 54 with slits 55 and 56 therealong for the reception of the upper and lower guide plates 21 and 22. The slot 52 has the intermediate guide plate 23 disposed therein.

The plate portions 50 and 51 have a connector 57 therebetween which is disposed in assembled relation between the plates 21 and 22 and the connector 57 and plate portions 50 and 51 at their junctions have slits 58 at which the end faces 26 engage.

The connector 57 has a flexible hinge strip 59 extending therefrom and from which the guide plates 60 and 61, with a slot 62 therebetween, extend and in which slot 62 the intermediate plate 23 is disposed.

Figure 2:
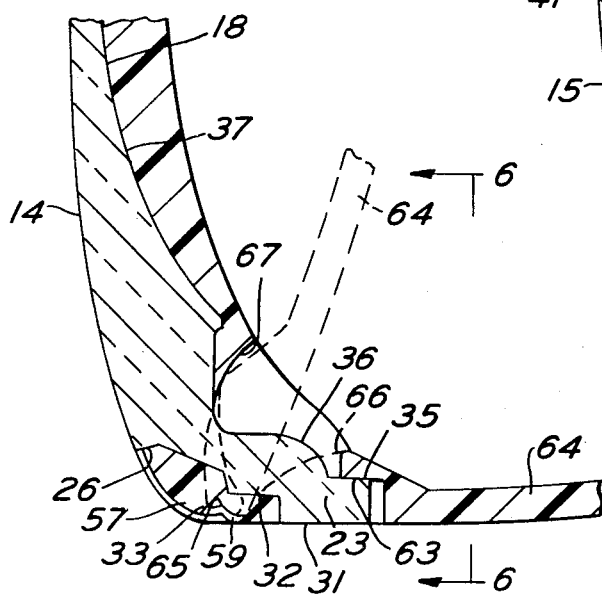
FIG. 2 is a fragmentary sectional view, enlarged, taken approximately on the line 2—2 of FIG. 1.
Figure 3:
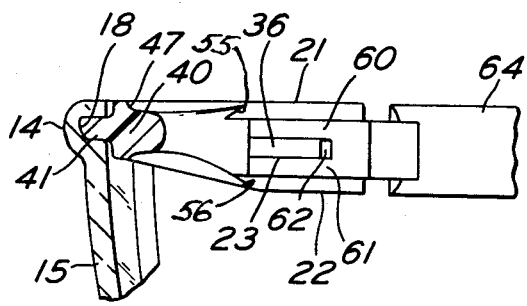
FIG. 3 is a fragmentary sectional view, enlarged, taken approximately on the line 3—3 of FIG. 1.

The slot 62 has an end boundary surface 63 which is engageable with the shoulder 35 to provide a limit stop (see FIG. 2).

The temples 64 extend from the guide plates at 60 and 61 and the slot 62 has the intermediate guide plate 23 disposed therein.

Each strip 59 has a central offset 65 and the portion of the strip 59 between the offset 65 and the guide plates 60 and 61 serves as a hinge for the temples 64. The plates 60 and 61 have faces 66 which engage, in folded position of the temples 64, with stop faces 67 on the plates portions 50 and 51.

It will be noted that the front component 11 and temple component 12 shown separated in FIG. 5 can be readily assembled by inserting the flange 41 into the central groove 18, inserting the intermediate plate portions 23 in the slots 52, and urging the two components into the assembled condition as shown in FIG. 1 and with the locking finger 43 of the locking pin 42 engaged with the locking shoulder 20.

In assembled condition the guide plates 60 and 61 of the temple component 12 are respectably disposed between the upper guide plate 21 and the intermediate guide plate 23, and between the intermediate guide plate 23 and the lower guide plate 22 of the front component 11. The hinge strip 59 permits movement of the temples 64 to the position for use with the shoulder 35 and end stop 63 in engagement or to the position for storage with the stop faces 66 in engagement with the stop faces 67.

In all position of the temples 64, the hinge action at the strips 59 is restricted as to movement by the engagement of the vertical guide plates 60 and 61 with the upper, intermediate and lower guide plates 21, 23 and 22.

The restraint of vertical movement at the hinge locations reduces vertical and undesired twisting stresses on the strips 59.

It will thus be seen that goggles and the like have been provided with which the objects of the invention are attained.

I claim:

1. A construction for goggles and the like comprising
   a front frame member having a horizontal bridge bar portion and carrying intermediate its ends a transparent element for support in front of the eyes, and
   a temple member including a horizontal bar portion extending along the length of and aligned with said bridge bar portion,
   said temple member including temples integrally connected to said temple bar portion by flexible hinge strips,
   One of said front frame member and said temple member having a horizontal plate portion thereon providing one of said interengaging members, and the other of said members having at least one horizontal plate portion thereon engaging said other horizontal plate portion,
   means for retaining said front frame member and said horizontal bar portion in engagement, and
   interengaging members on said bridge bar portion and said temple bar portion controlling the movement of said temple members at said hinge strips upon swinging movement of said temples.

2. The construction defined in claim 1 in which
   said interengaging members include a plurality of horizontally disposed guide plates on said bridge bar portion and horizontally disposed guide members on said temples in sliding engagement with said guide plates.

3. The construction defined in claim 1 in which
   said horizontal bridge bar portion and said temple bar portion have interengaged flange and groove portions and locking means for retaining said bar portions in assembled relation.

4. The construction defined in claim 1 in which
   said front frame member and said temple member respectively have engageable limit stop means for limiting the movement of said temple to position for wear.

5. The construction defined in claim 2 in which
   said guide plates include upper, lower and intermediate guide plates, and
   said guide members comprise interposed plate portions.

6. The construction defined in claim 1 in which
   said front frame member and said temple member have interengaged flange and groove portions, and spaced locking members are provided on said front frame member for retaining said portions in assembled relation.

7. The construction defined in claim 6 in which said interengaging members have portions retained in operative relation by the engagement of said flange and groove portions.

* * * * *